United States Patent
Strandberg et al.

(10) Patent No.: US 12,280,811 B2
(45) Date of Patent: Apr. 22, 2025

(54) SYSTEM AND METHOD FOR MONITORING THE HEALTH OF A DAMPER FOR A RAIL VEHICLE

(71) Applicant: DELLNER COUPLERS AB, Falun (SE)

(72) Inventors: Per Strandberg, Falun (SE); Magnus Lizell, Lidingö (SE)

(73) Assignee: DELLNER COUPLERS AB, Falun (SE)

( * ) Notice: Subject to any disclaimer, the term of this patent is extended or adjusted under 35 U.S.C. 154(b) by 210 days.

(21) Appl. No.: 18/011,680

(22) PCT Filed: Jun. 17, 2021

(86) PCT No.: PCT/SE2021/050597
§ 371 (c)(1),
(2) Date: Dec. 20, 2022

(87) PCT Pub. No.: WO2021/262068
PCT Pub. Date: Dec. 30, 2021

(65) Prior Publication Data
US 2023/0264723 A1    Aug. 24, 2023

(30) Foreign Application Priority Data
Jun. 26, 2020  (SE) .................... 2050781-0

(51) Int. Cl.
*B61G 11/12*   (2006.01)
*B61L 15/00*   (2006.01)
*F16F 9/32*    (2006.01)

(52) U.S. Cl.
CPC .......... *B61G 11/12* (2013.01); *B61L 15/0081* (2013.01); *F16F 9/3264* (2013.01); *F16F 9/3292* (2013.01)

(58) Field of Classification Search
CPC .... B61G 11/12; B61L 15/0081; F16F 9/3264; F16F 9/6292
See application file for complete search history.

(56) References Cited

U.S. PATENT DOCUMENTS

2019/0012849 A1* 1/2019 Fazeli .............. F16F 9/3292
2019/0152501 A1  5/2019 Homann
(Continued)

FOREIGN PATENT DOCUMENTS

DE  102018110462 A1  11/2019
EP       1184251 A1   3/2002
(Continued)

*Primary Examiner* — George C Jin
(74) *Attorney, Agent, or Firm* — Dilworth & Barrese, LLP; Michael J. Musella, Esq.

(57) ABSTRACT

There is provided a method for detecting failure of a gas-hydraulic damper for a rail vehicle, comprising: —receiving a first input signal (S1) indicative of a stroke related parameter of the gas-hydraulic damper determined at a first time instance, —determining a first stroke value based on the first input signal (S1). —receiving, at least one second input signal (Si), wherein each subsequent signal (Si) is indicative of a respective stroke related parameter measured at a respective subsequent time instance, —determining a respective stroke value based on each of the second input signals (Si), —determining a stroke value over time based on the determined stroke values, and —determining that there is a failure of the gas-hydraulic damper if the stroke value over time, fulfils a first criterion. Also provided are a system, a gas-hydraulic damper and computer program product.

21 Claims, 6 Drawing Sheets

(56) References Cited

U.S. PATENT DOCUMENTS

| | | | |
|---|---|---|---|
| 2020/0248773 A1* | 8/2020 | Chandrashekar | F16F 9/18 |
| 2022/0050450 A1* | 2/2022 | Chandrashekar | F16F 9/3292 |
| 2023/0038334 A1* | 2/2023 | Niemiec | F16F 9/3264 |

FOREIGN PATENT DOCUMENTS

| | | |
|---|---|---|
| EP | 1070647 B1 | 7/2004 |
| EP | 2612270 A1 | 7/2013 |
| EP | 2937594 A2 | 10/2015 |
| EP | 3379227 A1 | 9/2018 |
| GB | 2093946 A | 9/1982 |
| JP | 2008-007048 A | 1/2008 |

* cited by examiner

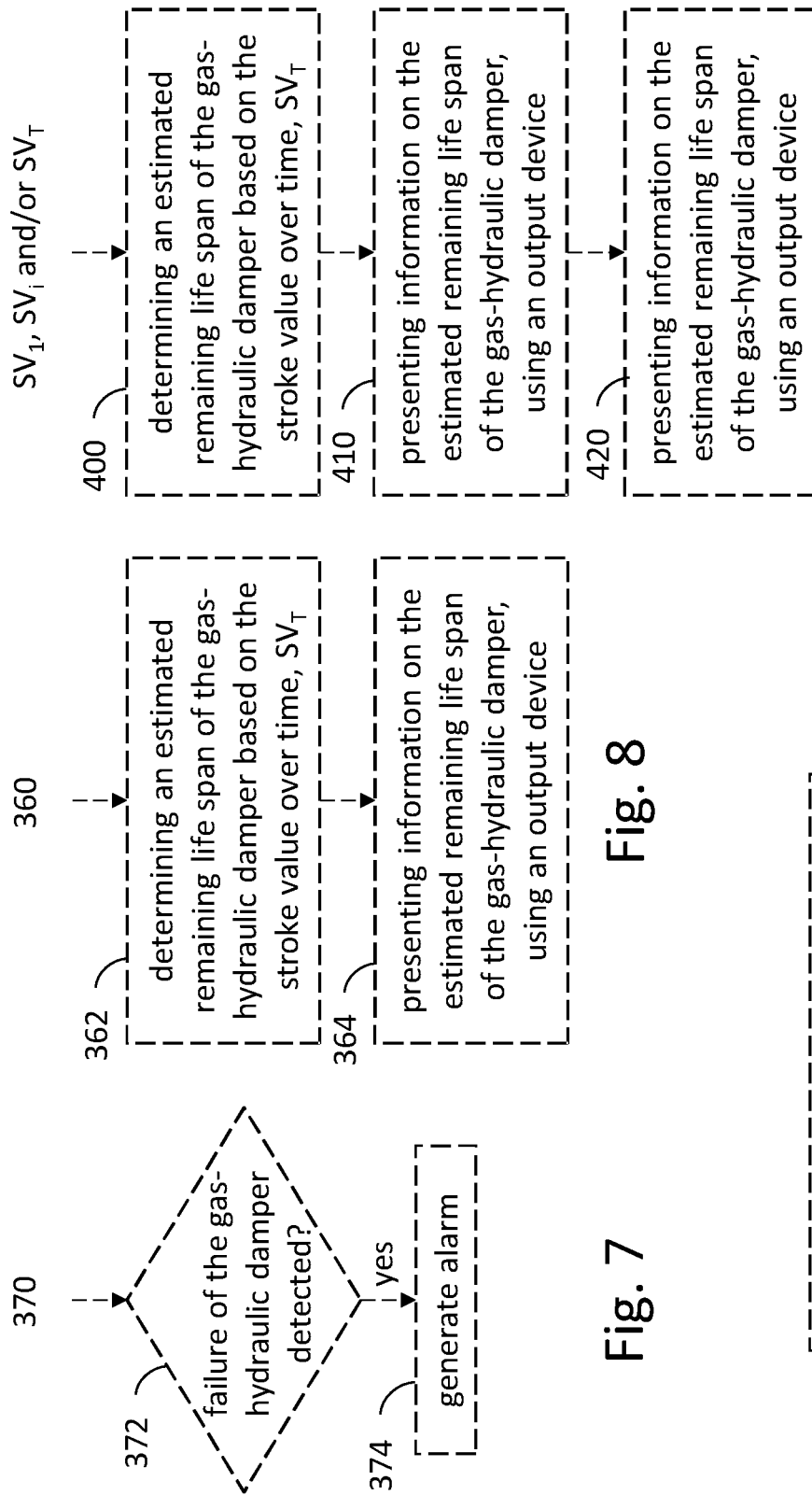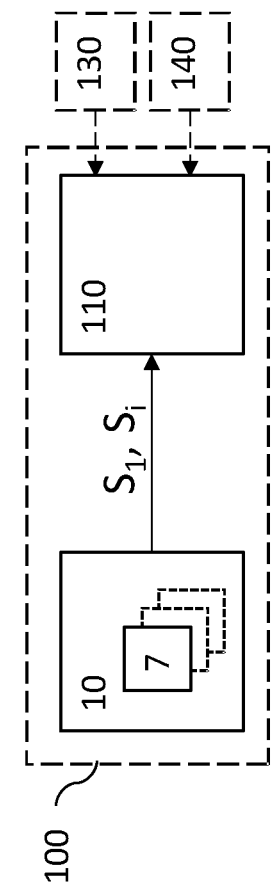

SYSTEM AND METHOD FOR MONITORING THE HEALTH OF A DAMPER FOR A RAIL VEHICLE

TECHNICAL FIELD

The present invention relates to a rail vehicle damper monitoring system and method for detecting failure of at least one gas-hydraulic damper used in a rail vehicle. The invention also relates to a gas-hydraulic damper used with such a system.

BACKGROUND

Hydraulic dampers, in the field also referred to as buffers, are commonly installed in central buffer couplings adapted for connection of rail vehicles. In the central buffer coupling a damper can be effective for absorbing shock loads in both compression and extension of the damper, in this way reducing jerking and smoothening the ride for passengers.

The general function and structure of the subject hydraulic dampers include a hollow piston which is received axially movable in a cylindrical housing. A volume of hydraulic fluid is contained in a working chamber in the housing. The working chamber communicates with an overflow chamber in the piston via a restriction. In compression of the damper, such as in the case of a buff load higher than moderate which pushes the piston further into the housing, hydraulic fluid is forced via the restriction into the overflow chamber as the volume of the working chamber is reduced. A partitioning element which slides freely in the hollow piston is displaced by the inrushing fluid, this way increasing the volume of the overflow chamber. The partition wall is displaced against the force of a compressible spring which is loaded while absorbing most or all of the energy that caused compression of the damper. This spring is usually a gas volume which under moderate load absorbs the energy generated in compression of the damper. In extension of the damper the spring releases its accommodated energy to return hydraulic fluid in the overflow chamber back to the working chamber. The reverse flow is typically routed other way bypassing the restriction, this way permitting a non-restricted return of the piston to its unloaded position. With the purpose of avoiding a heavy recoil as the piston is returned in extension motion, an additional chamber can be arranged to receive a smaller volume of hydraulic fluid during compression while returning the same volume via a restricted passage during extension of the damper, this way balancing the expansion of the gas spring and of the damper.

One problem commonly associated with dampers or buffers is that their performance is highly dependent on being able to retain the hydraulic fluid and the gas volume of the spring in order to absorb energy and then return to their original state so that they can be subjected to compressive forces again. If the performance of the damper decreases due to a low internal pressure, the stroke is reduced and therefore also the energy absorption capacity. The compressive force is then at least partly absorbed by other components such as non-regenerative elements of the train crash energy management system, so that the overall capacity to absorb crash energy is reduced. The result is that the ability of the systems provided for absorbing energy in the event of a crash is decreased and the structure can be damaged at lower speeds than intended.

When a problem such as an oil or gas leakage occurs in a damper, it is generally not possible today to detect that leakage. Also, if the leakage is small the damper may remain in service for a long time before performance has decreased to a degree that it is obvious that the damper needs maintenance.

At present, faulty dampers are repaired or replaced during normal maintenance that takes place at long but regular intervals. For logistic and economic reasons it is not possible to schedule maintenance at shorter intervals and it is also difficult to predict when performance loss at the damper would occur since many factors contribute to cause wear and damage.

There is therefore a need for an improved damper monitoring system and method that solve the problems associated with decreased performance and where failure can be detected earlier.

SUMMARY

The objective of the present invention is to eliminate or at least to minimize the problems mentioned above. This is achieved by a rail vehicle damper monitoring system, a gas-hydraulic damper, a computerized method for detecting failure of at least one gas-hydraulic damper for a rail vehicle, and a non-transitory computer-readable storage medium according to the appended independent claims.

The rail vehicle damper monitoring system according to the present invention comprises a gas-hydraulic damper for a rail vehicle and processing circuitry, and the gas-hydraulic damper comprises one or more sensor configured to measure a stroke related parameter and to send signals indicative of the measured stroke related parameter to the processing circuitry. The processing circuitry is configured to, for each of the at least one gas-hydraulic damper, detect failure of the gas-hydraulic damper receiving from one or more of the at least one sensor comprised in the gas-hydraulic damper a first input signal indicative of a stroke related parameter of the gas-hydraulic damper determined at a first time instance. Also, the processing circuitry is configured to determine a first stroke value based on the first input signal, to receive at least one second input signal from the one or more sensor, wherein each subsequent signal is indicative of a respective stroke related parameter measured at a respective subsequent time instance. The processing circuitry is also configured to determine a respective stroke value based on each of the second input signals, to determine a stroke value over time, based on the determined stroke values and to determine that there is a failure of the gas-hydraulic damper if the stroke value over time fulfils a first criterion.

Thereby, performance of the at least one gas-hydraulic damper is monitored and a failure can be detected if the stroke value over time fulfils a first criterion. This allows for detecting a failure even before performance of the damper has begun to seriously decrease so that damage to the gas-hydraulic damper and/or a rail vehicle in which the gas-hydraulic damper is mounted can be prevented. Due to the invention, maintenance or replacement of the gas-hydraulic damper can be scheduled depending on performance of the damper itself, enabling quick action if the damper is failing but at the same time avoiding unnecessary maintenance to fully functioning dampers. This is advantageous both in providing more cost-effective operation of the damper and in ensuring that the damper does operate at the desired level of performance when in use.

Suitably, the first criterion is that the stroke value over time is above a preset stroke threshold, and the processing circuitry is configured to determine that there is a failure of the damper if the stroke value over time is above the preset stroke threshold. Thereby, a failure can be detected if the stroke value over time is too large, since this would indicate a leakage of gas or hydraulic fluid in the gas-hydraulic damper. If a very large leakage has occurred, the stroke value over time would be very large and indicate that the damping ability of the damper is seriously decreased so that the gas-hydraulic damper should not be allowed to continue operation from a safety perspective.

Alternatively, or in combination, the first criterion is that the stroke value over time is above a preset integrated stroke value threshold, and the processing circuitry is configured to determine that there is a failure of the damper if the stroke value over time is above the preset integrated stroke value threshold. Thereby, a failure can be detected if the stroke value over time remains too large so that the gas-hydraulic damper has an unexpectedly large stroke over time. This would also indicate that there is a leakage in the gas-hydraulic damper and more particularly that there may be a leakage of hydraulic fluid that causes the damper to gradually decrease in performance. It is highly advantageous to be able to detect such a leakage before large quantities of hydraulic fluid have been lost, since this allows for maintenance or replacement of the damper before performance has decreased to a level where the damper is unable to respond as desired to a force applied to the damper during operation.

Suitably, one or more of the at least one sensor is a stroke sensor configured to measure the stroke of the damper, wherein the first stroke value and/or the at least one subsequent stroke value are the measured stroke of the damper at the respective time instance. Thereby, the stroke of the damper can be measured directly and be used in an easy and convenient way for determining the stroke value and the stroke value over time.

Suitably, one of more of the at least one sensor is a pressure sensor configured to measure a gas pressure or oil pressure of the damper, wherein the stroke related parameter is said gas pressure or oil pressure, and wherein the processing circuitry is configured to determine the stroke value over time based on a trend analysis of the measured gas pressure or oil pressure of the damper at the respective time instance. Thereby, a more cost efficient and sturdy sensor can be used to determine the pressure and the processing circuitry can be configured to determine the stroke of the damper based on the pressure.

Also, the system may comprise an ambient temperature sensor for measuring an ambient temperature. The processing circuitry is also configured to receive a temperature value from the ambient temperature sensor and determine the first stroke value and/or the stroke value over time also based on the ambient temperature. Thereby, expansion of the gas and/or hydraulic fluid in the damper due to variations in ambient temperature may be taken into account so that determining the stroke value based on the measured pressure may be made more accurate.

Suitably, the processing circuitry is further configured to compare the stroke value over time to a preset first coupling threshold and to determine that the rail vehicle is in a coupling mode in which the rail vehicle is currently being coupled to, or uncoupled from, another rail vehicle, based on the comparison of the stroke value over time to the preset first coupling threshold. Thereby, a coupling action can be detected and it can be allowed for the damper to fulfill the first criterion during the coupling action without detecting a failure. It is well known that the stroke of the damper during coupler is very high during a short time, and this can be used to distinguish between a situation where a coupling takes place and a situation during normal operation where the damper is running coupled in a rail vehicle.

Also, the processing circuitry may be configured to determine that there is a failure of the damper if the stroke value over time fulfils the first criterion only if the rail vehicle is currently not in the coupling mode. If the stroke value over time fulfills the first criterion during normal operation, this would indicate that there is a failure in the damper due to e.g. a leakage of hydraulic fluid or gas.

Suitably, the first criterion is that the stroke value over time is above a preset stroke threshold and that a rate of change of the stroke value over time is below a preset rate of change threshold, so that the processing circuitry is configured to detect a failure if the stroke value over time is above the preset stroke threshold and that the rate of change of the stroke value over time is below the preset rate of change threshold. Especially if the rate of change gradually increases over time this could indicate a small oil leakage that would be difficult to detect using conventional technology, and it is particularly advantageous to be able to detect a small leakage in this way before large quantities of hydraulic fluid have been lost.

Suitably, the processing circuitry is further configured to determine a static pressure of the damper gas chamber based on one or more of the received input signals and determine that there is a failure of the damper if the static pressure is below a predetermined pressure threshold. Thereby, the static pressure can be used as a second indicator to assist in determining if there is a failure of the damper. Since a very low static pressure would indicate a large gas leakage, it is especially important to be able to detect a failure in such cases and avoid a situation where the damper suddenly is unable to function. Furthermore, the processing circuitry may be configured to determine the static pressure also based on the ambient temperature to allow for compensation if the ambient temperature affects the static pressure.

Suitably, the processing circuitry is further configured to generate an alarm if a failure of the damper is detected. Thereby, the failure of the damper can be brought to the attention of personnel on the train or remotely so that action can be taken to avoid damage or injury because of the failure in the damper. Also, the alarm can be used to automatically schedule maintenance if desired.

Also, the processing circuitry may further be configured to determine an estimated remaining life span of the gas-hydraulic damper based on the stroke value over time. This also assists in scheduling maintenance or replacement of the damper depending on the operation of the damper so that a damper that has been in use a long period of time and that is subjected to repeated forces that cause the stroke of the damper to vary will be replaced sooner than a damper that has been in less heavy use.

Suitably, the system is further connected to an output device configured to present information regarding the estimated remaining life span of the gas-hydraulic damper to a user. Thereby, the information may be brought to the attention of a user as well.

The detected failure may be an internal oil leakage in the gas-hydraulic damper. Thereby, a leakage that would be difficult to detect by other means may be detected by analyzing the stroke of the damper as described herein. Since the hydraulic chambers in the damper are located inside the damper housing and are not available from the outside, the invention enables detection of a leakage even if it cannot be seen from the outside.

Also, the processing circuitry is further configured to determine a force based on the determined stroke values and/or the stroke value over time and to determine an estimated remaining life span of the gas-hydraulic damper based on a number of times that the force exceeds a first force threshold and/or a length of time that the force exceeds a first force threshold. Thereby, wear and tear of the damper can be monitored so that maintenance or replacement is scheduled for a damper that has been subjected to large forces repeatedly.

Suitably, the processing circuitry is further configured to determine a crash based on the force exceeding a second force threshold. Thereby, extremely large forces due to a collision can be detected and an alarm can be generated based on this detection. Also, since a collision will most likely render the damper unusable this information can also be used to indicate that the damper needs to be replaced.

The present invention also comprises a gas-hydraulic damper for a rail vehicle comprising a cylindrical housing wherein a hollow piston is received axially movable a working chamber of variable volume in the housing, an overflow chamber of variable volume in the piston, the hydraulic overflow chamber being connected to the hydraulic working chamber via a throttle that is in a flow passage between the working chamber and the overflow chamber, and a spring chamber of variable volume in the piston, the spring chamber being configured to hold a gas volume for acting as a spring, and the spring chamber being separated from the hydraulic overflow chamber by a separator piston that is axially movable. The gas-hydraulic damper further comprises one or more sensor configured to measure a stroke related parameter of the gas-hydraulic damper and to generate signals indicative of the measured stroke related parameter; and a transmitter configured to receive signals from the one or more sensor and further configured to transmit said signals to processing circuitry for determining a first stroke value based on a first input signal and determining that there is a failure of the gas-hydraulic damper if the first stroke value of the stroke fulfils a first criterion. Thereby, the stroke related parameter can be measured and transmitted to the processing circuitry.

Suitably, the at least one sensor comprises a stroke sensor configured to measure a stroke of the piston. This provides the advantage of measuring the stroke of the damper directly.

Also, the at least one sensor may comprise a pressure sensor configured to measure a gas pressure in the spring chamber. This provides the advantage of having a cost efficient and robust sensor that is able to detect the gas pressure from which the stroke can then be determined by the processing circuitry.

Suitably, the at least one sensor comprises a pressure sensor configured to measure an oil pressure in the working chamber and/or the overflow chamber. Thereby, pressure of the hydraulic fluid in the working chamber or the overflow chamber can be measured, and the stroke can be determined from this measurement by the processing circuitry. This pressure sensor can also be made cost efficient and reliable.

The present invention also provides a computerized method for detecting failure of at least one gas-hydraulic damper for a rail vehicle, comprising receiving, in processing circuitry communicatively connected to the gas-hydraulic damper, from one or more of at least one sensor comprised in the gas-hydraulic damper a first input signal indicative of a stroke related parameter of the gas-hydraulic damper determined at a first time instance, determining, using the processing circuitry, a first stroke value based on the first input signal, receiving, in the processing circuitry, at least one second input signal from the one or more sensor, wherein each subsequent signal is indicative of a respective stroke related parameter measured at a respective subsequent time instance determining, using the processing circuitry, a respective stroke value, based on each of the second input signals, determining, using the processing circuitry, a stroke value over time based on the determined stroke values and determining, using the processing circuitry, that there is a failure of the gas-hydraulic damper if the stroke value over time fulfils a first criterion.

The first criterion may be that the stroke value over time is above a preset stroke threshold, and determining, using the processing circuitry, may comprise determining that there is a failure of the damper if the stroke value over time is above the preset stroke threshold. Alternatively, the first criterion may be that the stroke value over time, $SV_T$, is above a preset integrated stroke value threshold and determining, using the processing circuitry, may comprise determining that there is a failure of the damper if the stroke value over time, $SV_T$, is above the preset integrated stroke value threshold. Any combination of these criterions may also be applied, if suitable.

Also, one or more of the at least one sensor may be a stroke sensor configured to measure the stroke of the damper, wherein the first stroke value and/or the at least one subsequent stroke value may be the measured stroke of the damper at the respective time instance.

Suitably, one of more of the at least one sensor is a pressure sensor configured to measure a gas pressure or oil pressure of the damper, wherein the stroke related parameter is said gas pressure or oil pressure, and wherein determining the stroke value over time using the processing circuitry, comprises determining the stroke value over time based on a trend analysis of the measured gas pressure or oil pressure of the damper at the respective time instance.

Also, the method may comprise receiving in the processing circuitry a temperature value from an ambient temperature sensor, and determining, using the processing circuitry, the first stroke value and/or the stroke value over time also based on the ambient temperature.

Furthermore, the method may comprise comparing, using the processing circuitry, the stroke value over time to a preset first coupling threshold, and determining, using the processing circuitry, that the rail vehicle is in a coupling mode in which the rail vehicle is currently being coupled to, or uncoupled from, another rail vehicle, based on the comparison of the stroke value over time to the preset first coupling threshold.

Suitably, the method may comprise using the processing circuitry, that there is a failure of the damper comprises determining that there is a failure of the damper if the stroke value over time, fulfils the first criterion only if the rail vehicle is currently not in the coupling mode.

The first criterion may be that the stroke value over time is above a preset stroke threshold and that a rate of change of the stroke value over time is below a preset rate of change threshold so that the method comprises determining, using the processing circuitry, that there is a failure of the damper if the stroke value over time is above the preset stroke threshold and if the rate of change of the stroke value over time is below the preset rate of change threshold. Thereby, it can be detected whether a creepage has occurred caused by a leakage of hydraulic fluid so that the damper has a stroke that is higher than expected and that changes slowly. It is particularly advantageous to be able to detect this since a small leakage of oil is generally difficult to detect in gas-hydraulic dampers.

The method may also comprise determining, using the processing circuitry, a static pressure of the damper gas chamber based on one or more of the received input signals, and determining, using the processing circuitry, that there is a failure of the gas-hydraulic damper if the static pressure is below a predetermined pressure threshold.

Also, the method may comprise determining the static pressure using the processing circuitry, comprises determining the static pressure also based on the ambient temperature.

Suitably, the method also comprises generating an alarm, using the processing circuitry, if a failure of the gas-hydraulic damper is detected.

Also, the method may comprise determining, using the processing circuitry, an estimated remaining life span of the gas-hydraulic damper based on the stroke value over time.

Suitably, the method comprises presenting information regarding the estimated remaining life span of the gas-hydraulic damper to a user, using an output device communicatively connected to the processing circuitry.

The detected failure may be an internal oil leakage in the gas-hydraulic damper.

The present invention also comprises a non-transitory computer-readable storage medium storing instructions which, when executed by processing circuitry of a rail vehicle damper monitoring system for detecting failure of at least one gas-hydraulic damper for a rail, cause the system to, for each of at least one gas-hydraulic damper comprised in the system:
  receive, in the processing circuitry, from one or more of at least one sensor comprised in the gas-hydraulic damper a first input signal indicative of a stroke related parameter of the gas-hydraulic damper determined at a first time instance,
  determine, using the processing circuitry, a first stroke value based on the first input signal,
  receive, in the processing circuitry, at least one second input signal from the one or more sensor, wherein each subsequent signal is indicative of a respective stroke related parameter measured at a respective subsequent time instance,
  determine, using the processing circuitry, a respective stroke value based on each of the second input signals,
  determine, using the processing circuitry, a stroke value over time based on the determined stroke values, and
  determine, using the processing circuitry, that there is a failure of the gas-hydraulic damper if the stroke value over time fulfils a first criterion.

The non-transitory computer-readable storage medium may further be storing instruction which, when executed by the processing circuitry, cause the system to perform the steps of the method according to the invention.

Additional benefits and advantages of the present invention will become readily apparent to the skilled person in view of the detailed description below.

DRAWINGS

The invention will now be described in more detail with reference to the appended drawings, wherein FIG. 1 is a schematic view of a gas-hydraulic damper according to one or more embodiment of the present invention;

FIG. 2 is a schematic view of a system according to one or more embodiment of the present invention;

FIG. 7 is a flow chart of a method according to one or more embodiment of the present invention;

FIG. 8 is a flow chart of a method according to one or more embodiment of the present invention; and FIG. 9 is a flow chart of a method according to one or more embodiment of the present invention.

Figure 1:
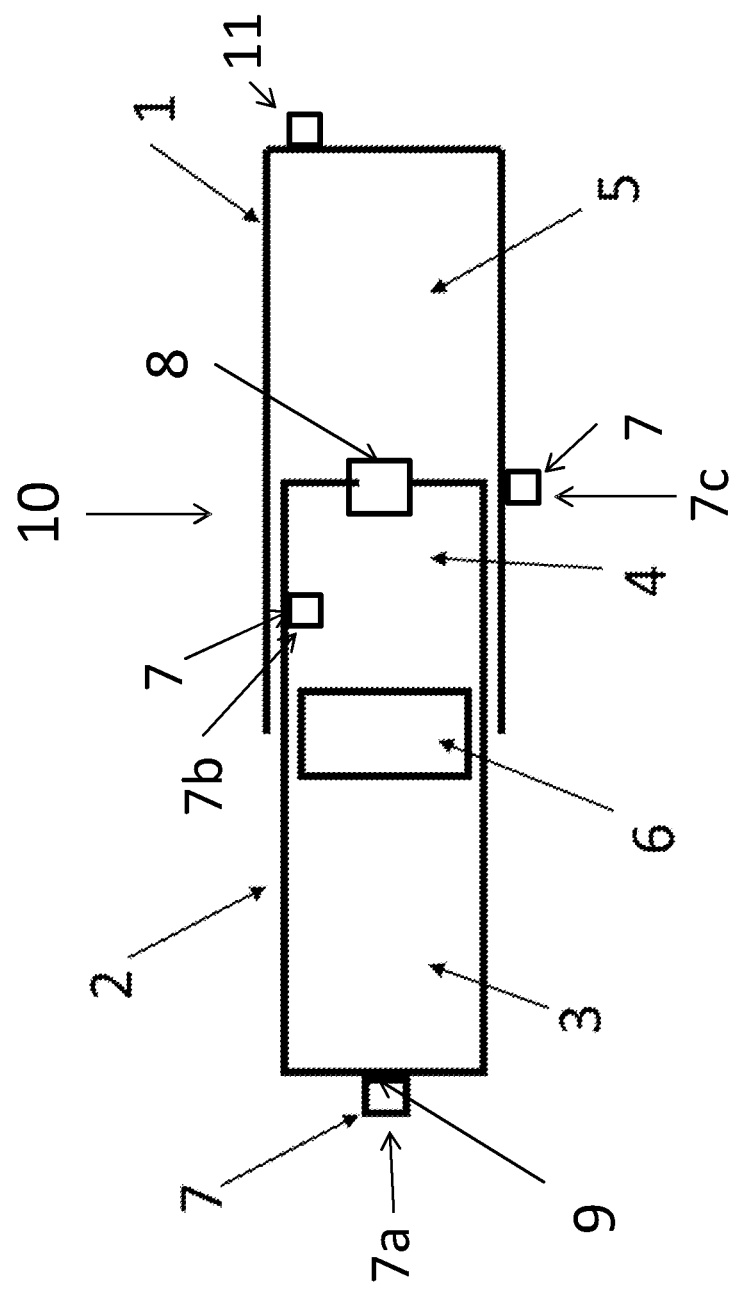

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Aspects of the present disclosure will be described more fully hereinafter with reference to the accompanying drawings. The methods and systems disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Gas-Hydraulic Damper

A gas-hydraulic damper will now be described with reference to FIG. 1.

The main structural components of a damper 10 according to a preferred embodiment of the present invention include a hollow piston 2 received to move axially in compression and extension directions in a cylinder housing 1. A hydraulic working chamber 5 in the housing 1, containing a volume of hydraulic fluid, is in fluid flow communication with an external hydraulic overflow chamber 4 in the hollow piston 2 via a throttle 8 that may suitably be in the form of a flow restriction and a non-return valve. The throttle is thus set to open in response to an increased predetermined pressure being generated in the hydraulic fluid volume in the working chamber, as the result of the piston and housing being compressed by external force. A gas volume in a spring chamber 3 is then compressed and loaded as hydraulic fluid is shifted from the working chamber to the overflow chamber. When the load on the piston ceases the gas expands to shift the fluid in the overflow chamber back to the working chamber via the throttle that can comprise a non-return valve, in a recoil following upon a compressive shock load. The spring chamber 3 is connected to the overflow chamber 4 but is separated from it by a separator piston 6 that is axially movable. As the fluid is returned to the working chamber 5 the separator piston 6 is able to move axially towards the overflow chamber 4 so that the pressure in the gas of the spring chamber 3 is decreased.

Also provided in the damper 10 is at least one sensor 7 that is arranged in the damper 10 to measure at least one stroke related parameter. The at least one sensor 7 may be arranged in different parts of the housing 1 and/or the piston 2 depending on what stroke related parameter is to be measured and how. In the preferred embodiment, a plurality of sensors 7, herein exemplified as sensors 7a, 7b and 7c, are shown to illustrate suitable placing of the at least one sensor 7, but it is to be noted that only one sensor 7 could also be used.

In the preferred embodiment, the at least one sensor is preferably a stroke sensor for measuring stroke of the damper 10, or alternatively a pressure sensor for measuring a gas pressure in the spring chamber 3 or an oil pressure in the working chamber 5 or the overflow chamber 4. In FIG. 1, a first sensor 7a shows a pressure sensor arranged in connection with the spring chamber 3 and configured to measure gas pressure in the spring chamber. A second sensor 7b shows a pressure sensor arranged in connection with the overflow chamber 4 and configured to measure oil pressure in the overflow chamber 4, whereas a third sensor 7c shows a pressure sensor arranged in connection with the working chamber 5 and configured to measure oil pressure in the working chamber. In embodiments where the at least one sensor includes a stroke sensor, that stroke sensor 7 may be placed in any of the locations shown for the first, second and third sensors 7a, 7b, 7c, or may alternatively be placed in another location on the gas-hydraulic damper 10, in the gas-hydraulic damper 10 or in connection with the gas-hydraulic damper 10.

In embodiments where the at least one sensor 7 is/are arranged on an outside of the damper 10 this is advantageous since it facilitates mounting and replacing of the at least one sensor 7, and it also enables mounting the at least one sensor 7 on a damper 10 that is already in use so that the present invention may be used with a gas-hydraulic damper according to the prior art. However, mounting the at least one sensor 7 inside the damper 10 may also be advantageous in enabling measurements inside the overflow chamber 4 and/or working chambers 5 that are usually not accessible from outside the damper 10.

The damper 10 according to the present invention also comprises at least one transmitter 11 that may be integrated with the at least one sensor 7 or that may alternatively be provided as a separate component that is arranged inside the damper 10, on the damper 10 or in connection with the damper 10. The transmitter 11 is operatively connected to the at least one sensor 7 such that a signal generated in the at least one sensor 7 can be sent from the at least one sensor 7 and be received by the transmitter 11.

Furthermore, the transmitter 11 is configured to transmit signals received from the at least one sensor to a receiver configured to receive signals. The receiver may be comprised in or external to a monitoring system according to the present invention and communicatively coupled to processing circuitry of said system, thereby enabling signals sent from the at least one sensor 7 to be received in the processing circuitry. Transmission and further processing of such signals is further described in connection with the system and method embodiments of FIGS. 2 to 9.

System Architecture

System embodiments will now be described with reference to FIG. 2.

FIG. 2 shows a rail vehicle damper monitoring system 100 for detecting failure of at least one gas-hydraulic damper 10 for a rail vehicle. The system 100 comprises a gas-hydraulic damper 10 for a rail vehicle and processing circuitry 110. The processing circuitry may 110 be implemented as hardware, software or firmware and it may be integrated in a coupler comprising the gas-hydraulic damper 10 to be monitored, or be external to said coupler and e.g. implemented in a train computer, a central server, or as a cloud service, and communicatively coupled to the system 100 by wire or wirelessly, i.e. via a wireless network.

The gas-hydraulic damper 10 comprises one or more sensor 7 configured to measure a stroke related parameter and to send signals indicative of the measured stroke related parameter to the processing circuitry 110.

The processing circuitry 110 is configured to, for each of the at least one gas-hydraulic damper 10, detect failure of the gas-hydraulic damper 10, by receiving, from one or more of the at least one sensor 7 comprised in the gas-hydraulic damper 10, a first input signal $S_1$ indicative of a stroke related parameter of the gas-hydraulic damper determined at a first time instance, $T_1$ and determining a first stroke value $SV_1$ based on the first input signal S1. The processing circuitry 110 is further configured to, for each of the at least one gas-hydraulic damper 10, receiving, a second input signal $S_i$ from the one or more sensor 7, wherein each subsequent signal $S_i$ is indicative of a respective stroke related parameter measured at the respective subsequent time instance, $T_i$; determining a respective stroke value $SV_i$ based on each of the second input signals $S_i$; determining a stroke value over time, $SV_T$, based on the determined stroke values $SV_1, SV_i$; and determining that there is a failure of the gas-hydraulic damper 10 if the stroke value over time, $SV_T$ fulfils a first criterion.

The detected failure may be an internal oil leakage in the gas-hydraulic damper 10 or may alternatively be a gas leakage in the gas-hydraulic damper 10.

The first criterion may be that the stroke value over time $SV_T$ is above a preset stroke threshold, and the processing circuitry 110 may in this case be configured to determine that there is a failure of the damper 10 if the stroke value over time $SV_T$ is above the preset stroke threshold. The preset stroke threshold is preferably set to indicate that if the value over time $SV_T$ is above it, there is an internal oil leakage in the damper. Advantageously, the preset stroke threshold may be selected as 95% of a maximum stroke of the damper, wherein a maximum stroke is a maximum mechanical stroke where an end of the piston 2 of the gas-hydraulic damper 10 reaches a bottom of the cylinder housing 1, i.e. when the piston 2 is as far to the right in FIG. 1 as possible. Thus, if 95% of the maximum stroke is selected as the preset stroke threshold, the processing circuitry 110 would determine that there is a failure of the damper 10 if the piston 2 reaches 95% of its maximum mechanical stroke into the cylinder housing 1.

The first criterion may alternatively be that an integrated stroke value over time is above a preset integrated stroke value threshold and the processing circuitry 110 may in this case be configured to determine that there is a failure of the damper 10 if the stroke value over time $SV_T$ is above the preset integrated stroke value threshold. A high integrated stroke value over time $SV_T$ would indicate that the stroke of the damper is undesirably large over time so that the stroke of the damper in response to tractive or compressive forces on the damper is larger than expected. This would also signify that an internal oil leakage has occurred so that the hydraulic fluid available in the damper is at a lower level than desired, and monitoring the integrated stroke value thus also allows for an early discovery of the oil leakage before large quantities of hydraulic fluid have been lost so that an acute malfunction of the damper occurs. In one embodiment, the preset integrated stroke value threshold may be 250 mm s. This would indicate that the stroke increases from zero to 50 mm during a period of about 100 s and signifies that an internal oil leakage has occurred and caused a creepage where the stroke gradually increases over a long period of time.

The first criterion may in some embodiments be that a combination of any or all of the options for the first criterion described above are fulfilled, if suitable.

When a small internal oil leakage occurs in the damper 10, creepage may occur where the stroke gradually increases in response to forces it is subjected to. The stroke would in such cases continuously be slightly larger than expected and the damper 10 could also slowly be compressed even when not subjected to a sufficient force to normally cause an activation of the damper 10 such as during acceleration of the rail vehicle in which the damper 10 is arranged.

Alternatively, a high absolute value for the rate of change of the stroke or a high integrated stroke value over time could indicate that the coupler 100 is currently being coupled to another coupler. This will be described in more detail further below.

One or more of the at least one sensor 7 may be a stroke sensor configured to measure the stroke of the damper, wherein the stroke related parameter is said measured stroke. The first stroke value $SV_1$ and/or the at least one subsequent stroke value $SV_i$ may in these embodiments be the measured stroke of the damper at the respective time instance $T_1$, $T_i$ or a calculated stroke value derived as a function of the measured stroke. The processing circuitry 110 may in these embodiments be configured to determine the stroke value over time, $SV_T$, based on a trend analysis of the stroke values $SV_1$, $SV_i$, i.e. based on a trend analysis of the measured stroke or calculated stroke of the damper measured at the different time instances $T_1$, $T_i$.

Alternatively, or in combination, one of more of the at least one sensor 7 may be a pressure sensor configured to measure a gas pressure or oil pressure of the damper, wherein the stroke related parameter is said gas pressure or oil pressure. The first stroke value $SV_1$ and/or the at least one subsequent stroke value $SV_i$ may in these embodiments be values derived as a function of the measured gas pressure or oil pressure of the damper at the respective time instance $T_1$, $T_i$. The processing circuitry 110 may in these embodiments be configured to determine the stroke value over time, $SV_T$, based on a trend analysis of the stroke values $SV_1$, $SV_i$, i.e. based on a trend analysis of the measured gas pressure or oil pressure of the damper measured at the different time instances $T_1$, $T_i$.

In some embodiments, the system 100 further comprises an ambient temperature sensor for measuring an ambient temperature. In these embodiments, the processing circuitry 110 may be configured to receive a temperature value from the ambient temperature sensor 130 and determine the first stroke value $SV_1$ and/or the stroke value over time $SV_T$ also based on the ambient temperature. This is advantageous in allowing for a compensation for the ambient temperature when the signals from the at least one sensor 7 are interpreted as stroke values. If the ambient temperature is high, a detected gas pressure and possibly also oil pressure in the damper would be high due to expansion of the gas or oil. Also, the temperature of the gas and hydraulic fluid of the damper 10 increases when the damper 10 is in operation so that a longer time of the damper 10 running coupled in a railway vehicle would result in a higher temperature inside the damper 10. The ambient temperature being detected would in such cases allow for the processing circuitry 110 compensating for such variations in temperature when determining the stroke values $SV_1$, $SV_i$ and the stroke value over time $SV_T$. For this purpose, the at least one sensor 7 may also be configured to detect an internal temperature of the damper 10, or alternatively a predicted temperature inside the damper 10 may be determined by the processing circuitry 110 by monitoring an operational duration of the damper 10. The ambient temperature could alternatively be determined by the processing circuitry 110 based on information such as weather forecasts.

The processing circuitry 110 may further be configured to compare the stroke value over time $SV_T$ to a preset first coupling threshold and determine that the rail vehicle is in a coupling mode in which the rail vehicle is currently being coupled to, or uncoupled from, another rail vehicle, based on the comparison of the stroke value over time $SV_T$ to the preset first coupling threshold. The preset first coupling threshold is a threshold for a rate of change or for an integrated stroke value that, if exceeded, indicates that the rail vehicle is in a coupling mode. The processing circuitry 110 may also be configured to take into account that the coupling mode would only last for a limited time, typically a few seconds that represent the time required for coupling one car of a rail vehicle to another. Thus, the coupling mode may be detected by determining that the stroke value over time $SV_T$ exhibits a rate of change or an integrated stroke value over time that exceeds the preset first coupling threshold during a predetermined coupling time. If the preset first coupling threshold is exceeded during a time that is longer than the predetermined coupling time, this would instead indicate a failure of the damper 10.

The processing circuitry 110 may in these embodiments further be configured to determine that there is a failure of the damper 10 if the stroke value over time $SV_T$ fulfils the first criterion only if the rail vehicle is currently not in the coupling mode. Thereby, a potential source of error in the failure detection is avoided or at least minimised.

Also, the first criterion for detecting a failure when the damper 10 is not in the coupling mode may be a combination of a preset stroke value threshold and a preset rate of change threshold where the first criterion is fulfilled if the stroke value over time $SV_T$ reaches or exceeds the preset stroke value threshold at the same time as a rate of change of the stroke value over time $SV_T$ is at the preset rate of change threshold or lower. Thereby it can be detected if a small leakage of hydraulic fluid has occurred that gradually lessens performance of the damper 10. A common problem with such leakage is that the leakage may be so small that there is only a gradual decrease in performance of the damper over time. By monitoring the stroke combined with the rate of change of the stroke it is possible to detect even such small leakages.

When the damper 10 is in use but the rail vehicle is not in the coupling mode, this would instead indicate that the damper 10 is running coupled in a rail vehicle and that the damper 10 is subjected to tractive and compressive forces that result from operation of the rail vehicle itself.

In some embodiments the processing circuitry 110 may be configured to determine a static pressure, P, of the damper gas chamber 102 based on one or more of the received input signals $S_1$, $S_i$ and determine that there is a failure of the damper 10 if the static pressure, P, is below a predetermined pressure threshold. If the ambient temperature has been determined the static pressure, P, of the damper gas chamber 102 may also be based on the ambient temperature value. Advantageously, the failure indicator that the static pressure, P, is below a predetermined pressure threshold, which may be referred to as a second criterion, may be used in combination with the first criterion to further improve the accuracy and reliability of the failure detection.

If a failure is detected, the processing circuitry 110 may further be configured to generate an alarm if a failure of the damper 10 is detected. The system may be configured to present the alarm using an output device 140 comprised in or connected to the system 100. Thereby, e.g. rail vehicle staff of the rail vehicle comprising the failing gas-hydraulic damper 10, staff responsible for maintenance of the rail vehicle, and/or a central coordination facility, or any other suitable entity, may be informed of the failure so that necessary measures may be taken. The alarm may be presented using the output device 150 via any suitable output interface, including but not limited to using visual output and/or audio output.

In some embodiments, the processing circuitry 110 may be configured to also determine a force on the damper 10 based on the determined stroke values $SV_1$, $SV_i$ and/or the stroke value over time $SV_T$ and/or the measured stroke related parameter. The force may then be monitored over time and may also be compared to one or more force thresholds in order to estimate a remaining life span of the damper 10 and to determine occurrence of a crash. A first force threshold may be set and forces exceeding the first force threshold, i.e. the first force threshold value, may indicate wear on the damper 10 that shortens its expected life span. A second force threshold, higher than the value of the first force threshold, may also be set and forces exceeding the second force threshold value may be large enough to indicate a crash that causes damage to the damper 10 and that possibly also activates a crash management system of the coupler in which the damper 10 is arranged and in the rail vehicle as a whole. When a force is determined that exceeds the second force threshold value, an alarm signal may be generated.

Suitably, the processing circuitry 110 may in some embodiments further be configured to determine an estimated remaining life span of the gas-hydraulic damper 10 based on the stroke value over time $SV_T$. Also in this case, information regarding the estimated remaining life span of the gas-hydraulic damper 10 may be presented using the output device 140, or another suitable output device, configured to present information regarding the estimated remaining life span of the gas-hydraulic damper 10 to a user.

METHOD EMBODIMENTS

In FIGS. 3 to 9, there are shown different embodiments of a computerized method for detecting failure of at least one gas-hydraulic damper 10 for a rail vehicle. In other words, FIGS. 3 to 8 show flow charts of a rail vehicle damper monitoring method for detecting failure of at least one gas-hydraulic damper 10 for a rail vehicle.

Figure 3:
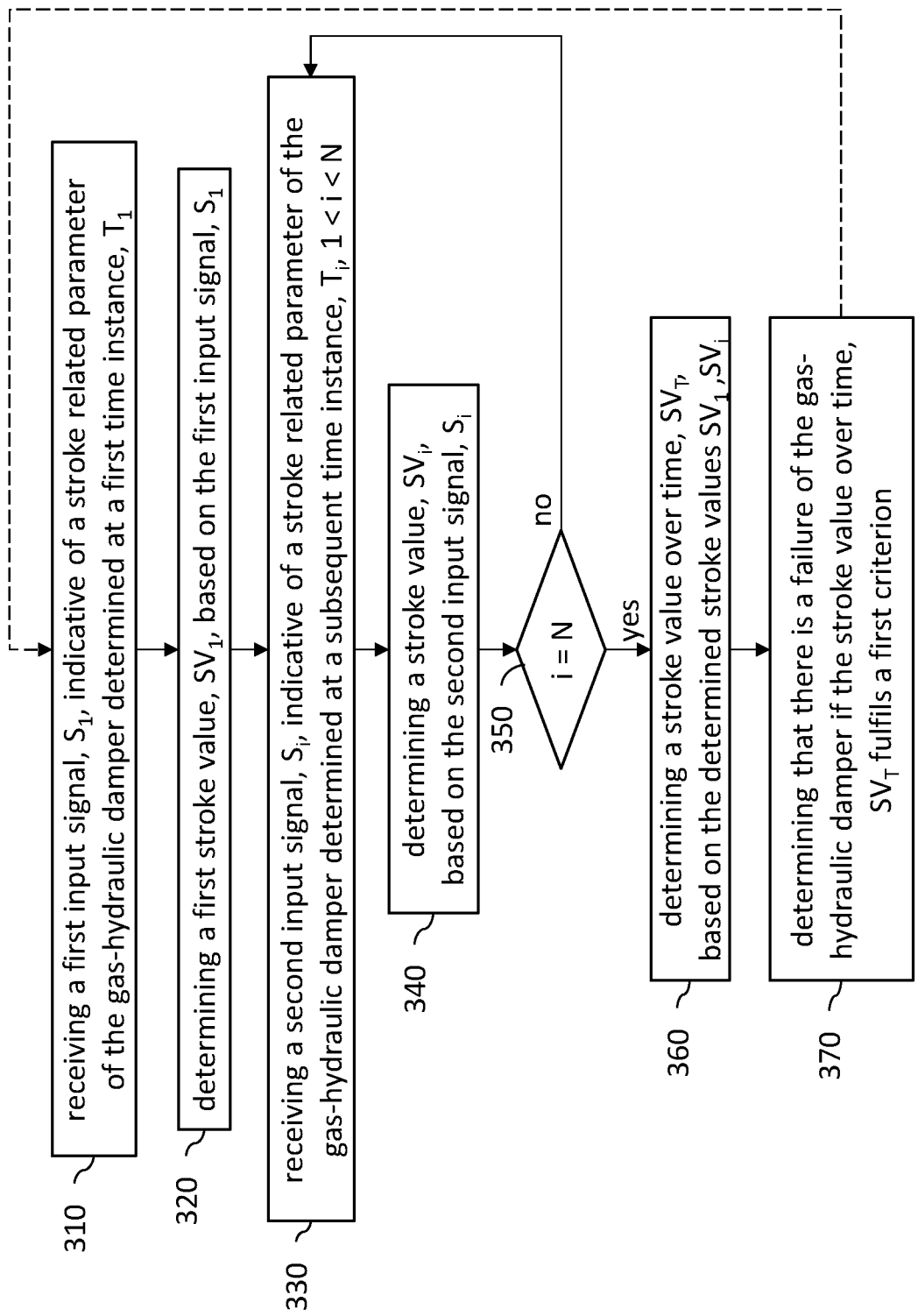
FIG. 3 is a flow chart of a method according to one or more embodiment of the present invention.

Turning first to FIG. 3, the method comprises, for each of at least one gas-hydraulic damper 10:

In step 310: receiving, in processing circuitry 110 communicatively connected to the gas-hydraulic damper 10, at at least one time instance, $T_i$, from one or more of at least one sensor 7 comprised in the gas-hydraulic damper 10 a first input signal $S_1$ indicative of a stroke related parameter of the gas-hydraulic damper determined at a first time instance, $T_1$.

In some embodiments, one or more of the at least one sensor 7 may be a stroke sensor configured to measure the stroke of the damper and the stroke related parameter may be said measured stroke of the damper.

In some embodiments, one or more of the at least one sensor 7 may be a pressure sensor configured to measure a gas pressure or oil pressure of the damper and the stroke related parameter may be said gas pressure or oil pressure.

The at least one sensor 7 may comprise one or more stroke sensor and one or more pressure sensor, and possibly also other suitable sensor types.

The method may further comprise, in optional step 315, receiving in the processing circuitry 100 an ambient temperature value from an ambient temperature sensor 130.

Figure 4:
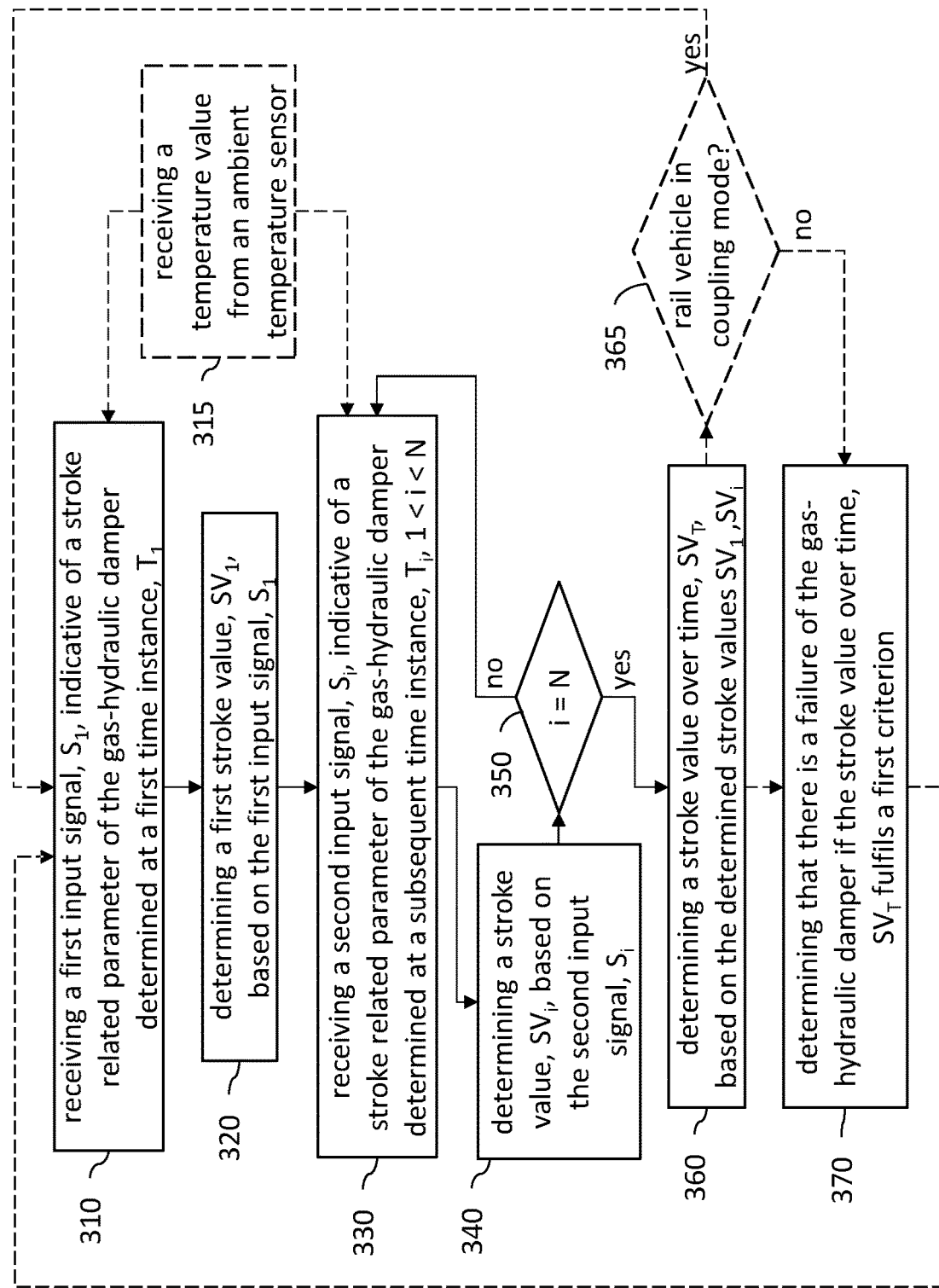
FIG. 4 is a flow chart of a method according to one or more embodiment of the present invention.

Optional step 315 is shown in FIG. 4 and it may be performed before, after, or in parallel with step 310.

The ambient temperature sensor from which the ambient temperature value is received may be located such that it measures the ambient temperature inside the gas-hydraulic damper 10, or outside the gas-hydraulic damper 10. If the measures the ambient temperature outside the gas-hydraulic damper 10, the method may comprise estimating the ambient temperature inside the gas-hydraulic damper 10 as a function of the measured ambient temperature outside the gas-hydraulic damper 10 before the ambient temperature value is used in any of the following method steps.

In step 320: determining, using the processing circuitry 110, a first stroke value $SV_1$ based on the first input signal $S_1$.

In embodiments wherein one or more of the at least one sensor 7 is a stroke sensor configured to measure the stroke of the damper, the first stroke value $SV_1$ may be the measured stroke of the damper at the respective time instance $T_1$, $T_i$.

In embodiments wherein one or more of the at least one sensor 7 is a pressure sensor configured to measure a gas pressure or oil pressure of the damper, the first stroke value $SV_1$ may be the measured gas pressure or oil pressure.

If a temperature value has been received in the optional step 315, the determination of the first stroke value $SV_1$ may further be based on the ambient temperature.

In step 330: receiving, in processing circuitry 110, at at least one subsequent time instance, $T_i$, a second input signal $S_i$ from the one or more sensor 7, wherein each subsequent signal $S_i$ is indicative of a respective stroke related parameter measured at the respective subsequent time instance, $T_i$.

In step 340: determining, using the processing circuitry 110, a respective stroke value $SV_i$ based on each of the second input signals $S_i$.

In embodiments wherein one or more of the at least one sensor 7 is a stroke sensor configured to measure the stroke of the damper, the at least one subsequent stroke value $SV_i$ may be the measured stroke of the damper at the respective time instance $T_1$, $T_i$.

In embodiments wherein one or more of the at least one sensor 7 is a pressure sensor configured to measure a gas pressure or oil pressure of the damper, the at least one subsequent stroke value $SV_i$ may be the measured gas pressure or oil pressure.

If a temperature value has been received in the optional step 315, the determination of the stroke value over time SVT may further be based on the ambient temperature.

In step 350: checking if all time instances have been evaluated for 0<i<N. In other words, step 350 comprises checking if i=N, where N is an integer ≥2. N may be predetermined and set in production or calibration, or it may be set during operation, using the processing circuitry 110. N may be a set number of time instances for which a respective first or second input signal, $S_1$, $S_1$, indicative of a stroke related parameter of the gas-hydraulic damper are to be received and processed, according to embodiments herein. Alternatively, N may depend on a set time interval during which respective first or second input signal, $S_1$, $S_1$, indicative of a stroke related parameter of the gas-hydraulic damper are to be received and processed, according to embodiments herein.

If i≠N, the method returns to step 330.

If i=N, the method continues in step 360.

In step 360: determining, using the processing circuitry 110, a stroke value over time, $SV_T$, based on the determined stroke values $SV_1$, $SV_i$.

In embodiments wherein one of more of the at least one sensor 7 is a stroke sensor configured to measure a stroke of the damper, determining the stroke value over time, $SV_T$, in step 360 may comprise determining the stroke value over time, $SV_T$, based on the result of a trend analysis of the measured stroke of the damper at the respective time instance $T_1$, $T_i$. In these embodiments, method step 360 may further comprise, and the processing circuitry may further be configured to, performing a trend analysis of the measured stroke of the damper at the respective time instance $T_1$, $T_i$ before determining the stroke value over time, $SV_T$.

In embodiments wherein one of more of the at least one sensor 7 is a pressure sensor configured to measure a gas pressure or oil pressure of the damper, determining the stroke value over time, $SV_T$, in step 360 may comprise determining the stroke value over time, $SV_T$, based on the result of a trend analysis of the measured gas pressure or oil pressure of the damper at the respective time instance $T_1$, $T_i$. In these embodiments, method step 360 may further comprise, and the processing circuitry may further be configured to, performing a trend analysis of the measured gas pressure or oil pressure of the damper at the respective time instance $T_1$, $T_i$ before determining the stroke value over time, $SV_T$.

The method may further comprise, in optional step 365, determining if the rail vehicle is currently in coupling mode. Optional step 365 is shown in FIG. 4.

Being in coupling mode means, in the current context, that the rail vehicle is currently being coupled to, or un-coupled from, another rail vehicle.

Determining if the rail vehicle is currently in coupling mode in optional step 365 may comprise comparing, using the processing circuitry 110, the stroke value over time, $SV_T$, to a preset first coupling threshold and then determining, using the processing circuitry 110, that the rail vehicle is in a coupling mode in which the rail vehicle is currently being coupled to, or uncoupled from, another rail vehicle, based on the comparison of the stroke value over time $SV_T$ to the preset first coupling threshold. The preset first coupling threshold may be selected in the interval 100-10 000 mm/s.

The preset first coupling threshold is selected as a value indicative of a large change of the measured stroke in a short amount of time, i.e. a rate of change of the stroke value that is too high to be measured when the rail vehicle is running coupled in normal operation. Such a high rate of change of the stroke value is typically indicative of the rail vehicle currently being coupled to, or uncoupled from, another rail vehicle. Typically, it may therefore be determined that the rail vehicle is currently in coupling mode if the comparison shows that the stroke value over time $SV_T$ is above the preset first coupling threshold. Alternatively, the preset first coupling threshold could be selected as an integrated stroke value over time, i.e. a large stroke that is maintained over time. A typical coupling time of less than 10 seconds, preferably less than 5 seconds could also be taken into account when determining if the preset first coupling threshold is exceeded.

As indicated by a dashed arrow in FIG. 4, if it is determined that the rail vehicle is in coupling mode, the failure detection method may return to step 310.

In step 370: determining, using the processing circuitry 110, that there is a failure of the gas-hydraulic damper 10 if the stroke value over time, $SV_T$ fulfils a first criterion.

In some embodiments, the first criterion may be that the stroke value over time $SV_T$ is above a preset stroke threshold. In these embodiments the determining in step 370 comprises determining that there is a failure of the damper 10 if the stroke value over time $SV_T$ is above the preset stroke threshold. The preset stroke threshold is in one embodiment 90% of the maximum stroke of the damper 10.

In other embodiments, the first criterion may be that the stroke value over time, $SV_T$, is above a preset rate of change threshold, and determining, using the processing circuitry 110, may comprise determining that there is a failure of the damper 10 if the stroke value over time, $SV_T$, is above the preset rate of change threshold.

In yet other embodiments, the first criterion may be that the stroke value over time, $SV_T$, is above a preset integrated stroke value threshold and determining, using the processing circuitry 110, may comprise determining that there is a failure of the damper 10 if the stroke value over time, $SV_T$, is above the preset integrated stroke value threshold.

In some embodiments, the first criterion may comprise a combination of two or all of the options described above.

The detected failure may be an internal oil leakage in the gas-hydraulic damper 10.

If the optional step 365 has been performed, determining that there is a failure of the damper 10 may also be based on the determined coupling mode. Specifically, step 370 may in these embodiments comprise determining that there is a failure of the damper 10 if the stroke value over time $SV_T$ fulfils the first criterion only the rail vehicle has not been determined to currently be in the coupling mode in optional step 365. Suitably, a source of error wherein coupling, or de-coupling, of a rail vehicle to another vehicle being wrongly interpreted as a failure of the damper due to the high stroke values induced is thereby removed, or at least minimized.

Figure 5:
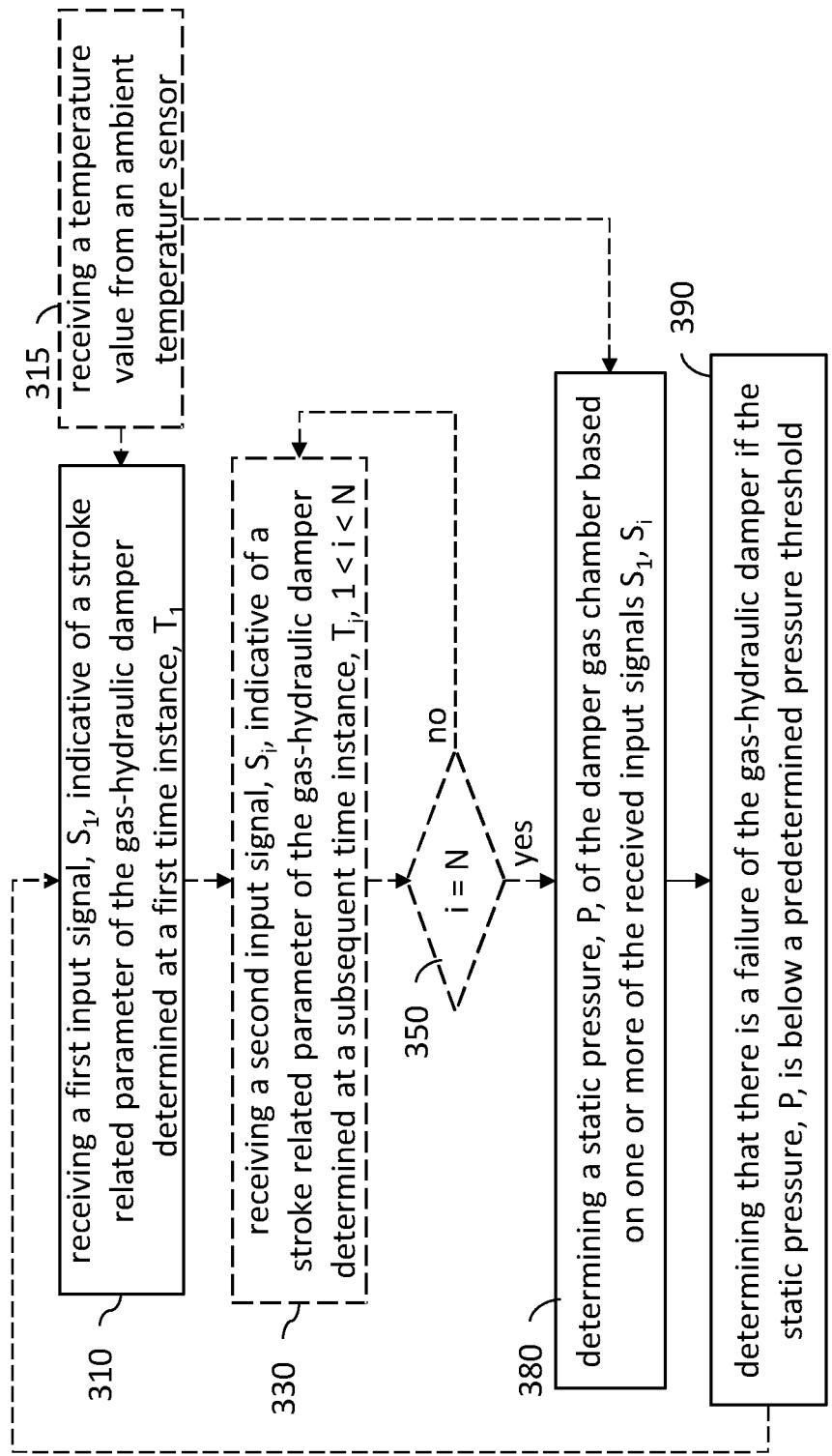
FIG. 5 is a flow chart of a method according to one or more embodiment of the present invention.

Turning now to FIG. 5, there is shown embodiments wherein the method comprises steps 310 and optionally steps 315, 330 and 350 described above, wherein one of more of the at least one sensor 7 is a pressure sensor configured to measure a gas pressure or oil pressure of the damper and the stroke related parameter is said gas pressure or oil pressure. In the embodiments of FIG. 5 the method further comprises:

In step 380: determining, using the processing circuitry 110, a static pressure, P, of the damper gas chamber 102 based on one or more of the received input signals $S_1$, $S_i$.

In other words, the static pressure, P, of the damper gas chamber 102 is determined based on the gas pressure or oil pressure received from the one or more pressure sensor. If there is a single pressure sensor and a measurement is performed at a single time instance, the static pressure is set to the value of the stroke related parameter, i.e. said gas pressure or oil pressure. If signals are received from more than one pressure sensor, or from one or more pressure sensors at more than one time instance (i.e. if steps 330 and 350 are performed), the static pressure is determined based on the values of the more than one thus received stroke related parameters, in any suitable manner.

According to any of the embodiments of step 380, the static pressure, P, of the damper gas chamber 102 may also be determined based on a received temperature value from an ambient temperature sensor, which may be the same ambient temperature sensor as previously described herein, or a different one.

In step 390: determining, using the processing circuitry 110, that there is a failure of the gas-hydraulic damper 10 if the static pressure, P, is below a predetermined pressure threshold. Suitably, the predetermined pressure threshold is 50% of a nominal pressure of the damper 10. In other embodiments, the predetermined pressure threshold may instead be 60% or even 70% in order to detect an even smaller leakage in the damper 10. In yet other embodiments, the predetermined pressure threshold may be 40% or even 30% in order to avoid detecting the failure until a severe gas leakage has occurred so that function of the damper 10 is severely impaired.

In one damper 10 according to the present invention the nominal pressure is 30 bar (gauge pressure) and for this damper a detected pressure of 15 bar or less would indicate a severe gas leakage. Generally, the nominal pressure of a gas-hydraulic damper is in the range of 5-100 bar and it is to be noted that the damper 10 according to the present invention may suitably have a nominal pressure anywhere in this range.

Figure 6:
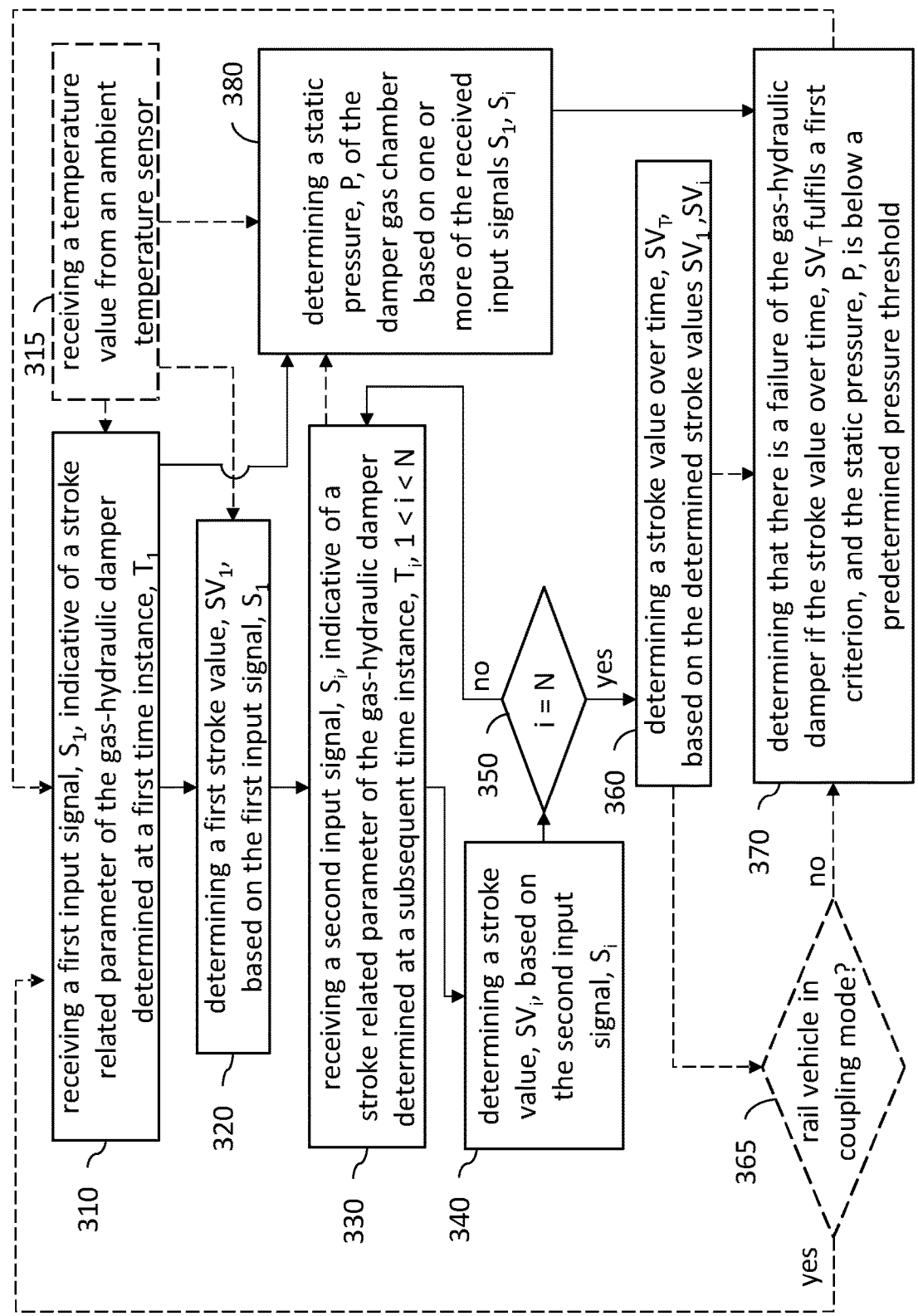
FIG. 6 is a flow chart of a method according to one or more embodiment of the present invention.

In FIG. 6, a combination of any of the embodiments of FIG. 3 or 4 with any of the embodiments of FIG. 5 is shown, wherein step 370 comprises determining that there is a failure of the gas-hydraulic damper 10 if the stroke value over time, $SV_T$, fulfils the first criterion and the static pressure, P, is below a predetermined pressure threshold.

By basing the failure detection on two separate failure indicators, it is further ensured that the detected failure is not a false positive.

In one or more optional embodiment, as illustrated in FIG. 7, the method described in connection with any of FIG. 3, 4 or 6 may further comprise, after step 370:

In step 372: checking if a failure of the gas-hydraulic damper 10 has been detected and, if a failure of the gas-hydraulic damper 10 has been detected: In step 374: generating an alarm, using the processing circuitry 110.

The alarm may be presented to e.g. the rail vehicle staff of the rail vehicle comprising the failing gas-hydraulic damper 10, staff responsible for maintenance of the rail vehicle, and/or a central coordination facility, or any other suitable entity. It may be presented via any suitable output interface, including but not limited to using visual output and/or audio output.

In one or more optional embodiment, as illustrated in FIG. 8, the method described in connection with any of FIG. 3, 4 or 6 may further comprise, after step 360:

In step 362: determining, using the processing circuitry 110, an estimated remaining life span of the gas-hydraulic damper 10 based on the stroke value over time, $SV_T$.

In some embodiments, the method then further comprises:

In step 364: presenting information regarding the estimated remaining life span of the gas-hydraulic damper 10 to a user, using an output device 140 communicatively connected to the processing circuitry 110.

The method according to any of the embodiments presented in connection with FIGS. 3 to 9 may be performed repeatedly, as indicated by a dashed arrow from step 370 to step 310 in FIGS. 3, 4, 5, 6 and 7. Embodiments of the invention may be combined if suitable, to obtain even further advantageous embodiments.

In one or more optional embodiment, as illustrated in FIG. 9, the method described in connection with any of FIG. 3, 4, 5 or 6 may further comprise:

In step 400: determining a force based on the determined stroke values $SV_1$, $SV_i$ and/or the stroke value over time $SV_T$.

In step 410: determining an estimated remaining life span of the gas-hydraulic damper (10) based on a number of times that the force exceeds a first force threshold and/or a length of time that the force exceeds the first force threshold.

The determined force may be monitored over time and may also be compared to the value of the first force threshold in order to estimate a remaining life span of the damper 10. The first force threshold value may be set to a value that, when exceeded, indicates wear on the gas-hydraulic damper 10 that shortens the gas-hydraulic dampers 10 expected life span. If the first force threshold value is exceeded, the life span of the gas-hydraulic damper may then be estimated as a function of a previously known or estimated life span and the number of times that the determined force exceeds the first force threshold and/or a length of time that the force exceeds the first force threshold.

In some embodiments, the method also comprises:

In step 420: determining, using the processing circuitry (110), that a crash has occurred if the determined force exceeds a second force threshold.

The second force threshold has a value that is higher than the value of the first force threshold. The second force threshold may suitably be set to a value that, when exceeded, indicates a crash that causes damage to the damper 10, and that possibly also activates a crash management system of the coupler in which the damper 10 is arranged, and possibly also in the rail vehicle as a whole.

Optionally, when a force is determined that exceeds the second force threshold value, an alarm signal may be generated. The alarm may be generated and presented in any known manner, e.g. to staff of the railway vehicle, a central coordination facility, or any other suitable entity, so that the thereby informed party may take necessary measures.

FURTHER EMBODIMENTS

In an aspect of the invention there is provided a non-transitory computer-readable storage medium storing instructions which, when executed by processing circuitry 110 of a rail vehicle damper monitoring system 100 for detecting failure of at least one gas-hydraulic damper 10 for a rail, cause the system 100 to, for each of at least one gas-hydraulic damper 10 comprised in the system 100: receive, in the processing circuitry 110, from one or more of at least one sensor 7 comprised in the gas-hydraulic damper 10 a first input signal $S_1$ indicative of a stroke related parameter of the gas-hydraulic damper determined at a first time instance, $T_1$; determine, using the processing circuitry 110, a first stroke value $SV_1$ based on the first input signal $S_1$; receive, in the processing circuitry 110, at least one second input signal $S_i$ from the one or more sensor 7, wherein each subsequent signal $S_i$ is indicative of a respective stroke related parameter measured at a respective subsequent time instance, $T_i$; determine, using the processing circuitry 110, a respective stroke value $SV_i$ based on each of the second input signals $S_i$; determine, using the processing circuitry 110, a stroke value over time, $SV_T$, based on the determined stroke values $SV_1, SV_i$; and determine, using the processing circuitry 110, that there is a failure of the gas-hydraulic damper 10 if the stroke value over time, $SV_T$ fulfils a first criterion.

The non-transitory computer-readable storage medium may further store instruction which, when executed by the processing circuitry 110, cause the system 100 to perform the method steps of any of the embodiments described in connection with FIGS. 3 to 9.

The invention claimed is:

1. Rail vehicle damper monitoring system (100) for detecting failure of at least one gas-hydraulic damper (10) for a rail vehicle, the system (100) comprising:
a gas-hydraulic damper (10) for a rail vehicle; and
processing circuitry (110); wherein
the gas-hydraulic damper (10) comprises at least one sensor (7) configured to measure a stroke related parameter and to send signals indicative of the measured stroke related parameter to the processing circuitry (110);
the processing circuitry (110) is configured to, for each of the at least one gas-hydraulic damper (10), detect failure of the gas-hydraulic damper (10), by:
receiving from one or more of the at least one sensor (7) in the gas-hydraulic damper (10), a first input signal (S1) indicative of a stroke related parameter of the gas-hydraulic damper determined at a first time instance (T1),
determining a first stroke value (SV1), based on the first input signal (S1),
receiving at least one second input signal (Si) from the at least one sensor (7),
each subsequent signal (Si) is indicative of a respective stroke related parameter measured at a respective subsequent time instance (Ti),
determining a respective stroke value (SVi), based on each of the second input signals (Si),
determining a stroke value over time (SVT), based on the determined stroke values (SV1, SVi), and
determining failure of the gas-hydraulic damper (10) if the stroke value over time (SVT) fulfills a first criterion; and
the damper (10) comprises,
a cylindrical housing (1) in which a hollow piston (2) is received axially movable,
a working chamber (5) of variable volume in the housing (1);
an overflow chamber (4) of variable volume in the piston (2), the hydraulic overflow chamber (4) being connected to the hydraulic working chamber (5) via a throttle (8) in a flow passage between the working chamber (5) and the overflow chamber (4);
a spring chamber (3) of variable volume in the piston (2), the spring chamber (3) configured to hold a gas volume for acting as a spring, and being separated from the hydraulic overflow chamber (4) by a separator piston (6) that is axially movable; and
a transmitter configured to receive signals from the at least one sensor (7) and transmit said signals to processing circuitry for determining the first stroke value (SV1) based on the first input signal (S1) and failure of the gas-hydraulic damper (10) if the first stroke value (SV1) of the stroke fulfills the first criterion.

2. The system (100) of claim 1, wherein the first criterion is the stroke value over time (SVT) above a preset stroke threshold, and the processing circuitry (110) is configured to determine the failure of the damper (10) if the stroke value over time (SVT) is above the preset stroke threshold.

3. The system (100) of claim 1, wherein the first criterion is the stroke value over time (SVT) above a preset integrated stroke value threshold, and the processing circuitry (110) is configured to determine the failure of the damper (10) if the stroke value over time (SVT) is above the preset integrated stroke value threshold.

4. The system (100) of claim 1, wherein one or more of the at least one sensor (7) is a stroke sensor configured to measure the stroke of the damper, and the first stroke value (SV1) and/or the at least one subsequent stroke value (SVi) are the measured stroke of the damper at the respective time instance (T1, Ti).

5. The system (100) of claim 1, wherein one or more of the at least one sensor (7) is a pressure sensor configured to measure gas pressure or oil pressure of the damper, the stroke related parameter is said gas pressure or oil pressure, and the processing circuitry (110) is configured to determine the stroke value over time (SVT) based on trend analysis of the gas pressure or oil pressure of the damper measured at the time instances (T1, Ti).

6. The system (100) of claim 1, wherein the processing circuitry (110) is further configured to:
determine static pressure (P) of the damper gas chamber (102) based on one or more of the received input signals (S1, Si); and
determine failure of the damper (10) if the static pressure (P) is below a predetermined pressure threshold.

7. The system (100) of claim 6, wherein the processing circuitry (110) is configured to determine the static pressure (P) also based on ambient temperature.

8. The system (100) of claim 1, wherein the processing circuitry (110) is further configured to generate an alarm if failure of the damper (10) is detected.

9. The system (100) of claim 1, wherein the processing circuitry (110) is further configured to determine estimated remaining life span of the gas-hydraulic damper (10) based on the stroke value over time (SVT).

10. Gas-hydraulic damper for a rail vehicle, comprising
a cylindrical housing (1) in which a hollow piston (2) is received axially movable,
a working chamber (5) of variable volume in the housing (1),
an overflow chamber (4) of variable volume in the movable piston (2), the hydraulic overflow chamber (4) being connected to the hydraulic working chamber (5) via a throttle (8) in a flow passage between the working chamber (5) and the overflow chamber (4),
a spring chamber (3) of variable volume in the piston (2), the spring chamber (3) configured to hold a gas volume for acting as a spring, and being separated from the hydraulic overflow chamber (4) by a separator piston (6) that is axially movable within the hollow piston (2) and with respect to the hollow piston (2),
at least one sensor (7) configured to measure a stroke related parameter of the gas-hydraulic damper (10) and generate signals indicative of the measured stroke related parameter; and
a transmitter configured to receive signals from the at least one sensor (7) and transmit said signals to processing circuitry for determining a first stroke value (SV1) based on a first input signal (S1) and failure of the gas-hydraulic damper (10) if the first stroke value (SV1) of if the stroke fulfills a first criterion.

11. Gas-hydraulic damper (10) according to claim 10, wherein the at least one sensor comprises a stroke sensor configured to measure a stroke of the piston (2).

12. Gas-hydraulic damper (10) according to claim 10, wherein the at least one sensor comprises a pressure sensor configured to measure gas pressure in the spring chamber (3).

13. Gas-hydraulic damper (10) according to claim 10, wherein the at least one sensor comprises a pressure sensor configured to measure an oil pressure in the working chamber (5) and/or the overflow chamber (4).

14. Gas-hydraulic damper (10) according to claim 10, additionally comprising an ambient temperature sensor (130).

15. A rail vehicle damper monitoring system (100) for detecting failure of at least one gas-hydraulic damper (10), comprising
a gas-hydraulic damper (10) for a rail vehicle; and
processing circuitry (110); wherein
the gas-hydraulic damper (10) comprises at least one sensor (7) configured to measure a stroke related parameter and to send signals indicative of the measured stroke related parameter to the processing circuitry (110);
the processing circuitry (110) is configured to, for each of the at least one gas-hydraulic damper (10), detect failure of the gas-hydraulic damper (10), by:
receiving from one or more of the at least one sensor (7) in the gas-hydraulic damper (10), a first input signal (S1) indicative of a stroke related parameter of the gas-hydraulic damper determined at a first time instance (T1),
determining a first stroke value (SV1), based on the first input signal (S1),
receiving at least one second input signal (Si) from the at least one sensor (7),
each subsequent signal (Si) is indicative of a respective stroke related parameter measured at a respective subsequent time instance (Ti),
determining a respective stroke value (SVi), based on each of the second input signals (Si),
determining a stroke value over time (SVT), based on the determined stroke values (SV1, SVi), and
determining failure of the gas-hydraulic damper (10) if the stroke value over time (SVT) fulfills a first criterion; additionally comprising
an ambient temperature sensor for measuring ambient temperature, and the processing circuitry (110) is configured to:
receive a temperature value from the ambient temperature sensor (130); and
determine the first stroke value (SV1) and/or the stroke value over time (SVT), also based on the ambient temperature.

16. A non-transitory computer-readable storage medium storing instructions which, when executed by processing circuitry (110) of a rail vehicle damper monitoring system (100) according to claim 15, for detecting failure of at least one gas-hydraulic damper (10) for a rail, cause the system (100) to, for each of at least one gas-hydraulic damper (10) in the system (100):
receive, in the processing circuitry (110), from one or more of at least one sensor (7) in the gas-hydraulic damper (10), a first input signal (S1) indicative of a stroke related parameter of the gas-hydraulic damper determined at a first time instance (T1),
determine, using the processing circuitry (110), a first stroke value (SV1) based on the first input signal (S1),
receive, in the processing circuitry (110), at least one second input signal (Si) from the at least one sensor (7), each subsequent signal (Si) indicative of a respective stroke related parameter measured at a respective subsequent time instance (Ti),
determine, using the processing circuitry (110), a respective stroke value (SVi) based on each of the second input signals (Si),
determine, using the processing circuitry (110), a stroke value over time (SVT) based on the determined stroke values (SV1, SVi), and
determine, using the processing circuitry (110), failure of the gas-hydraulic damper (10) if the stroke value over time (SVT) fulfills a first criterion.

17. A rail vehicle damper monitoring system (100) for detecting failure of at least one gas-hydraulic damper (10), comprising
a gas-hydraulic damper (10) for a rail vehicle; and
processing circuitry (110);
wherein
the gas-hydraulic damper (10) comprises at least one sensor (7) configured to measure a stroke related parameter and to send signals indicative of the measured stroke related parameter to the processing circuitry (110);
the processing circuitry (110) is configured to, for each of the at least one gas-hydraulic damper (10), detect failure of the gas-hydraulic damper (10), by:
receiving from one or more of the at least one sensor (7) in the gas-hydraulic damper (10), a first input signal (S1) indicative of a stroke related parameter of the gas-hydraulic damper determined at a first time instance (T1),
determining a first stroke value (SV1), based on the first input signal (S1),
receiving at least one second input signal (Si) from the at least one sensor (7),
each subsequent signal (Si) is indicative of a respective stroke related parameter measured at a respective subsequent time instance (Ti),
determining a respective stroke value (SVi), based on each of the second input signals (Si),
determining a stroke value over time (SVT), based on the determined stroke values (SV1, SVi),
determining failure of the gas-hydraulic damper (10) if the stroke value over time (SVT) fulfills a first criterion; and
the processing circuitry (110) is further configured to:
compare the stroke value over time (SVT), to a preset first coupling threshold; and
determine the rail vehicle is in a coupling mode in which the rail vehicle is currently being coupled to, or uncoupled from, another rail vehicle, based on the comparison of the stroke value over time (SVT), to the preset first coupling threshold.

18. The system (100) of claim 17, wherein the processing circuitry (110) is further configured to:
determine failure of the damper (10) if the stroke value over time (SVT) fulfills the first criterion only if the rail vehicle is currently not in the coupling mode.

19. The system of claim 18, wherein the first criterion is the stroke value over time (SVT) above a preset stroke threshold and rate of change of the stroke value over time (SVT) below a preset rate of change threshold, so that the processing circuitry (110) is configured to detect failure if the stroke value over time (SVT) is above the preset stroke threshold and the rate of change of the stroke value over time (SVT) is below the preset rate of change threshold.

20. Computerized method for detecting failure of at least one gas-hydraulic damper (10) for a rail vehicle damper monitoring system (100) including processing circuitry (110); wherein
the gas-hydraulic damper (10) comprises at least one sensor (7) configured to measure a stroke related parameter and to send signals indicative of the measured stroke related parameter to the processing circuitry (110);

the processing circuitry (110) is configured to, for each of the at least one gas-hydraulic damper (10), detect failure of the gas-hydraulic damper (10), by:

receiving from the at least one sensor (7) in the gas-hydraulic damper (10), a first input signal (S1) indicative of a stroke related parameter of the gas-hydraulic damper determined at a first time instance (T1), determining a first stroke value (SV1), based on the first input signal (S1), receiving at least one second input signal (Si) from the at least one sensor (7), each subsequent signal (Si) is indicative of a respective stroke related parameter measured at a respective subsequent time instance (Ti), determining a respective stroke value (SVi), based on each of the second input signals (Si), determining a stroke value over time (SVT), based on the determined stroke values (SV1, SVi), and determining failure of the gas-hydraulic damper (10) if the stroke value over time (SVT) fulfills a first criterion;

additionally comprising an ambient temperature sensor for measuring ambient temperature, and the processing circuitry (110) is configured to:

receive a temperature value from the ambient temperature sensor (130); and determine the first stroke value (SV1) and/or the stroke value over time (SVT), also based on the ambient temperature, said method comprising for each of the at least one gas-hydraulic damper (10), the steps of:

receiving, in the processing circuitry (110) communicatively connected to the gas-hydraulic damper (10), from the at least one sensor (7) in the gas-hydraulic damper (10), said first input signal (S1) indicative of said stroke related parameter of the gas-hydraulic damper determined at said first time instance (T1), determining, using the processing circuitry (110), said a first stroke value (SV1) based on the first input signal (S1), receiving, in the processing circuitry (110), said at least one second input signal (Si) from the at least one sensor (7), each said subsequent signal (Si) indicative of said respective stroke related parameter measured at said respective subsequent time instance (Ti), determining, using the processing circuitry (110), said respective stroke value (SVi) based on each of the second input signals (Si), determining, using the processing circuitry (110), said stroke value over time (SVT) based on the determined stroke values (SV1, SVi), and determining, using the processing circuitry (110), failure of the gas-hydraulic damper (10) if the stroke value over time (SVT) fulfills a first criterion.

21. The method of claim 20, wherein the first criterion is the stroke value over time (SVT) above a preset stroke threshold, and determining, using the processing circuitry (110), failure of the damper (10) if the stroke value over time (SVT) is above the preset stroke threshold.

* * * * *